United States Patent [19]

Ostermeier

[11] Patent Number: 5,657,665
[45] Date of Patent: Aug. 19, 1997

[54] TANK FILLING LEVEL INDICATOR, ESPECIALLY FOR A DEVICE FOR COUNTRYSIDE, GARDEN, LAWN OR YARD CARE

[75] Inventor: Heinrich Ostermeier, Köln, Germany

[73] Assignee: SABO-Maschinenfabrik GmbH, Gummersbach, Germany

[21] Appl. No.: 512,382

[22] Filed: Aug. 8, 1995

[30] Foreign Application Priority Data

Aug. 25, 1994 [DE] Germany .................... 9413660 U

[51] Int. Cl.$^6$ ............... G01F 23/02; G01F 23/56; B65D 51/16
[52] U.S. Cl. ............... 73/323; 73/319; 116/228; 220/366.1; 220/374
[58] Field of Search ............... 73/290 R, 323, 73/325, 326, 328, 329, 330, 309, 319; 116/227, 228; 277/29, 53; 215/307, 329; 220/563, 366.1, 374

[56] References Cited

U.S. PATENT DOCUMENTS

| | | | |
|---|---|---|---|
| 1,210,385 | 12/1916 | Hunziker | 73/323 |
| 1,367,164 | 2/1921 | Miller | 220/374 |
| 2,593,172 | 4/1952 | Neumann | 73/323 |
| 3,062,049 | 11/1962 | Javor | 73/323 |
| 3,453,886 | 7/1969 | Avrea | 73/323 |
| 3,944,104 | 3/1976 | Watson et al. | 215/307 |
| 4,036,393 | 7/1977 | Neiman | 220/374 |
| 4,693,393 | 9/1987 | DeMinco et al. | 220/374 |
| 4,971,219 | 11/1990 | Dombeck et al. | 220/374 |
| 5,435,454 | 7/1995 | Ishii | 220/374 |

Primary Examiner—William A. Cuchlinski, Jr.
Assistant Examiner—Andrew Hirshfeld
Attorney, Agent, or Firm—Harness, Dickey & Pierce, P.L.C.

[57] ABSTRACT

A fill level indicator (7) for a tank (6) of an internal combustion engine (5) has a housing (8) with an inner chamber (9) connected to the tank (6) to allow the fill level indicator (7) to be visible. The housing (8) includes an upwardly directed housing strip (21) which projects laterally from an outer face (20) of the housing (8). The housing strip (21), when in a fitted condition, engages a groove (19) of an edge (16) to an upwardly directed opening (24) which is closed by a cover (14) which may be fixed to the housing (8). The cover (14) includes at least one lug (28) which is tensionable against the tank edge (16) and the cover (14) extends over an upper end (13) of the housing (8). A labyrinth seal is provided between the housing (8) and the cover (14), and the seal forms connecting ventilation channels (25, 26, 27), arranged one above the other.

6 Claims, 2 Drawing Sheets

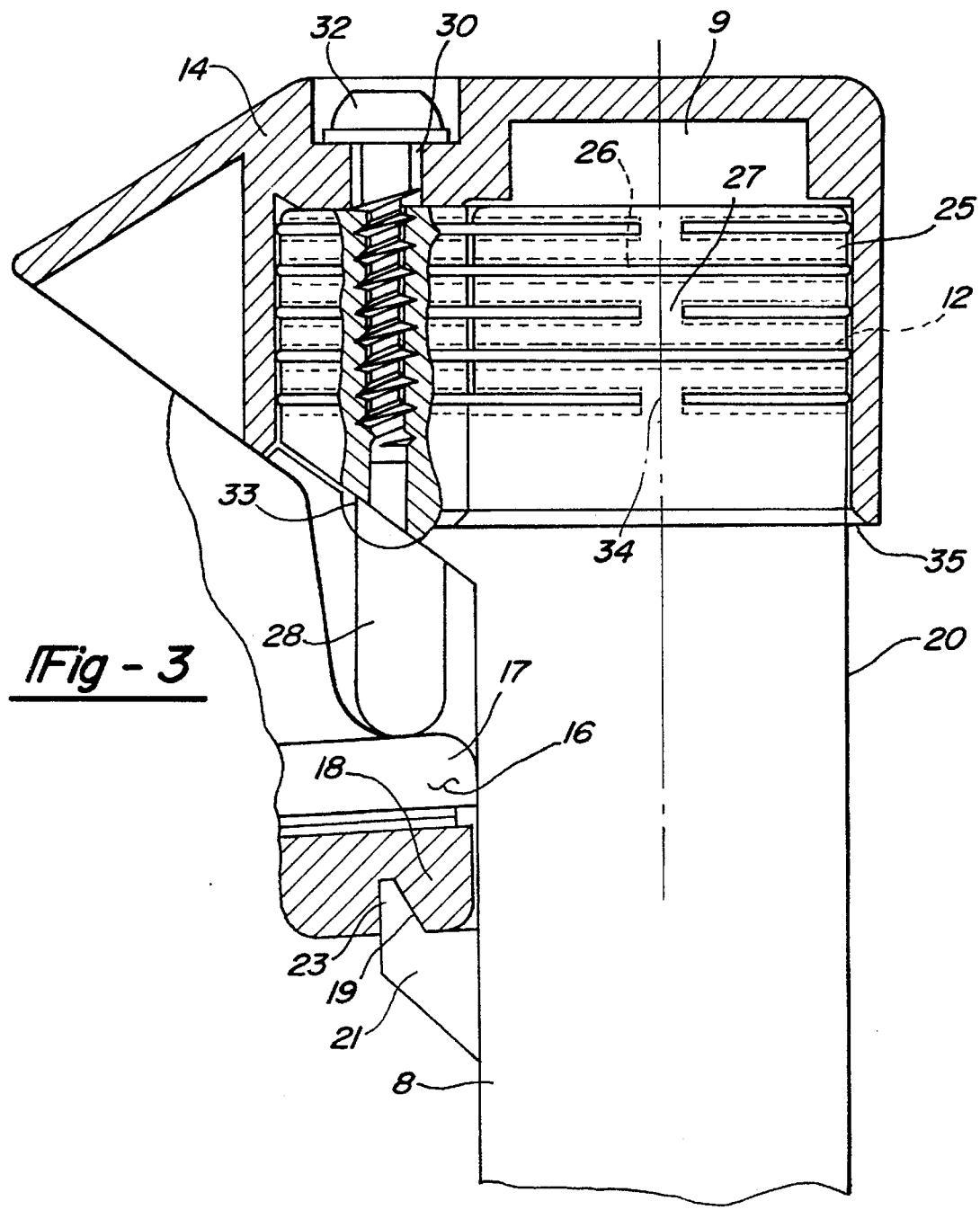

TANK FILLING LEVEL INDICATOR, ESPECIALLY FOR A DEVICE FOR COUNTRYSIDE, GARDEN, LAWN OR YARD CARE

BACKGROUND OF THE INVENTION

The invention relates to a filling level indicator for a fuel tank of an internal combustion engine which is fueled by liquid fuel to operate a device. Preferably, the device is for countryside, garden, lawn or yard care. The device has a housing whose inner chamber is connected to a tank. Also the device includes a mechanism to make the filling level visible, a mechanism to ventilate the inner chamber of the housing and a mechanism to fix the housing to the tank.

SUMMARY OF THE INVENTION

It is an object of the invention to provide a fill level indicator which is of a simple design, is easy to associate with the tank and, even if the position of the indicator changes relative to the resting face, does not enable fuel to escape.

In accordance with the invention, the tank includes an edge which laterally projects from one of its side faces and forms an open groove. The groove opens downward towards the resting face on which the device rests when in use. The housing has an upwardly directed holding strip which laterally projects from its outer face. The holding strip, in the fitted condition, engages the groove of the edge. The upwardly directed opening of the housing is closed by a cover which may be fixed to the housing. The cover includes at least one lug tensionable against the edge of the tank and extends over the upper end of the housing. A labyrinth seal is provided between the two parts which forms a ventilation channel leading to the free environment.

An advantage of this embodiment is that the edge normally existing in the case of a plastic tank can be used to attach the filling level indicator. The edge is normally formed by the weld of the two dishes forming the tank. Furthermore, the fixing means, at the same time, may be used to constitute the ventilation region which is necessary for the filling level indicator to be effective, but at the same time ensures that even when the tank is in an inclined position, the filling level indicator does not enable any fuel to escape.

Furthermore, the labyrinth seal ensures that the fill level is indicated in a delayed way. Thus, any changes in the filling level which result from a constant change in the position of the tank, for example when associated with a device realized as a lawn mower operating in a hilly or undulating area, does not immediately lead to a change in fuel level indication. If the indicator followed the movements immediately, this would be disadvantageous since it would constantly change its indication as a function of the nature of the area treated.

In a further embodiment of the invention, the cover includes a projection to provide support against the side face of the tank. In this way, the filling level indicator is held at the tank in an improved way. The projection provides additional support. For fixing purposes, it is easy to use the cover which is securable to the housing by a bolt threaded into the housing.

To ensure that the fill level indicator does not allow any fuel to escape when the device is in an inclined position, for example when cleaning tools attached to the housing, the housing, in its outer face in the region of its upper end, includes parallel extending channels arranged around the housing to form a labyrinth seal. The channels are connected to one another by connecting channels in diametrically opposed regions such that for each two channels arranged one above the other, the connecting channels are alternately associated with diametrically opposed regions. The cover, via its inner face, sealingly covers the housing portion provided with ribs as far as the outlet towards the lower cover edge.

A particularly advantageous effect is achieved for inclined positions if the housing with the cover is associated with a tank side face which extends parallel to the direction of movement of the device. Also, the connecting channels are arranged in an intersecting plane extending transversely to the direction of movement.

To achieve directional ventilation, the grooves may extend at an angle.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is illustrated in the drawing with reference to a lawn mower constituting the device, wherein:

FIG. 3 is an enlarged partial cross-section view of FIG. 2 of the parts referring to sealing the region between the cover and housing of the fill level indicator.

DETAILED DESCRIPTION OF THE DRAWINGS

Figure 1:
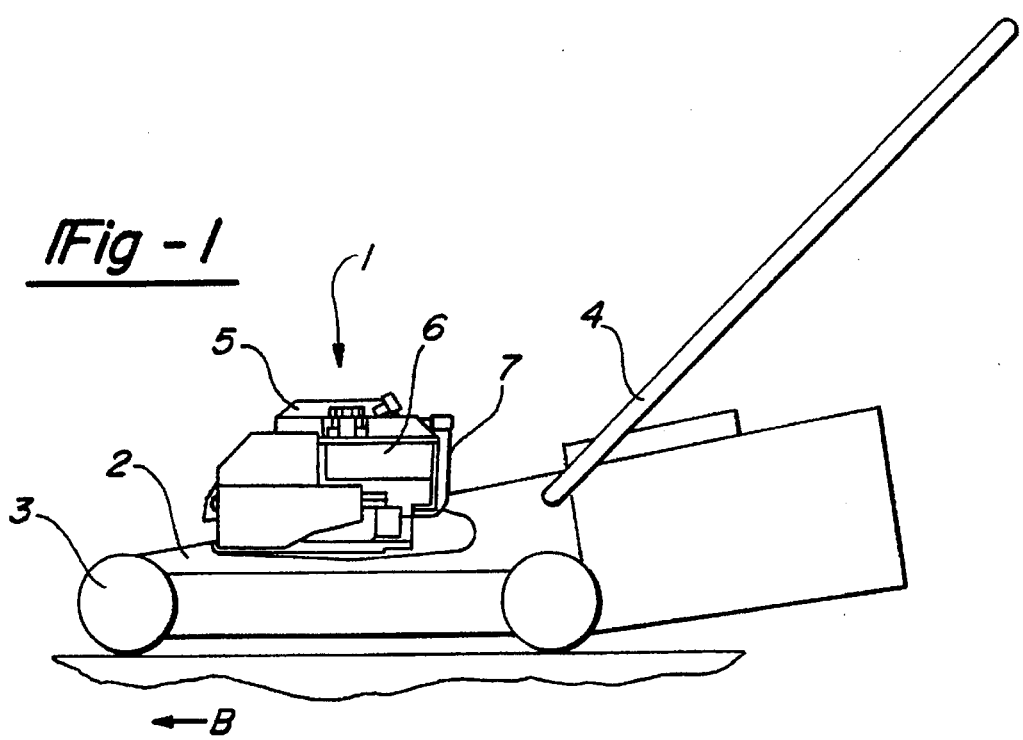
FIG. 1 is a side view of a lawn mower, showing the fill level indicator attached to the tank.

The device 1 shown in FIG. 1, in the form of a lawn mower, includes a housing 2 movable by four wheels 3 on the ground, for instance on a lawn, in the direction of arrow B. The device is moved by a manually operated handle bar 4.

For driving the tools, for example the blade of the device 1, an internal combustion engine 5 is used. The engine's fuel is stored in a tank 6. The stored quantity of fuel may be monitored by a fill level indicator 7 associated with the tank. The fill level indicator 7 is shown associated with the tank 6 side face facing the handle bar 4.

Figure 2:
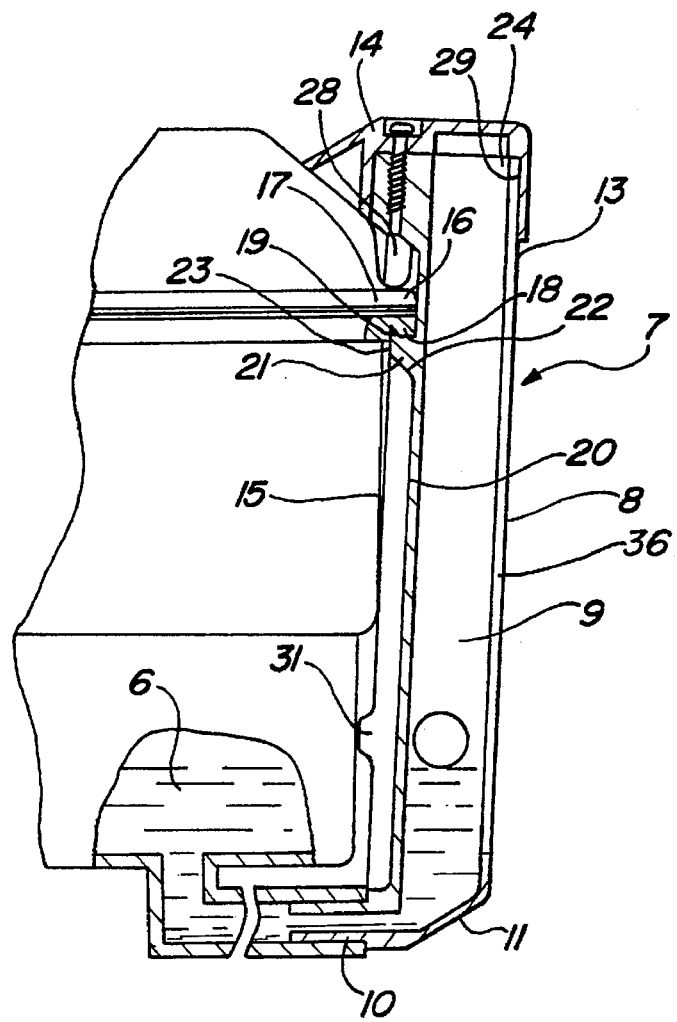
FIG. 2 is an enlarged cross-section view through part of the wall of the tank and through the fill level indicator.

The design of the fill level indicator 7 and its association with the tank 6 are illustrated in particular in FIG. 2. The fill level indicator 7 includes a housing 8 which has an inner chamber 9 extending along the height of the housing 8 and sealed by a base. A connecting mechanism 10 is provided at the lower end 11 of the housing 8. The connecting mechanism 10 connects the connecting line leading to the tank 6.

The housing 8 also includes a visible portion 36 which extends from the housing lower end 11 towards the upper end 13 of the housing 8 and makes the fill level visible. The housing 8 may be either entirely or partially of transparent plastics, and further may be provided with colored balls or the like, i.e. floats, which indicate the fill level more clearly.

The fill level indicator 7 is fixed to the tank 6 on an edge 16 laterally projecting from the side face 15 of the tank 6. The edge 16 includes a horizontally extending edge portion 17 and an edge portion 18 extending vertically downwards at a distance from the side face 15. A downwardly opposing groove 19 is formed between the side face 15 and the vertically extending edge portion 18. A holding strip 21 projects from the portion of the outer face 20 of the housing 8 of the fill level indicator 7, which portion is positioned opposite the side face 15 of the tank 6. The holding strip 21 is formed by a lower, horizontally extending holding portion 22 and a substantially vertical, upwardly extending holding portion 23, which starts from the holding portion 22. The holding portion 23 engages the groove 19 of the edge 16 of the tank 6. The opening 24 of the housing 8 is covered by a cover 14. The cover 14, via its inner face 29, extends over the upper end 13 of the housing 8.

The housing 8, on its outer face 20, is provided with a plurality of parallel channels 25 which are delimited by spaced ribs 12 as seen in FIG. 3. Each two channels 25, arranged directly one above the other, are connected to one another by connecting channels 26, 27. The connecting channels 26, 27 are arranged on diametrically opposed sides of the outer face 20 of the housing 8. Thus, the channels achieve a kind of labyrinth or meander type extension. In FIG. 3, the ribs 12 are shown at a ninety degree angle with respect to the outer face 20. Thus, the channels are shown at a ninety degree angle. However, the channels could be angled at an angle other than ninety degrees.

An outlet 34 is provided towards the end facing the cover edge 35 of the cover 14. The cover 14, via its inner face 29, sealingly rests against the ribs 12 of the upper end 13 of the housing 8, to form an effective seal between the cover 14 and the housing 8. The air in the inner chamber 9 may escape outwardly through the channels 25 and the connecting channels 26, 27 and through the outlet 34. The length and direction of extension of the channels 25 and connecting channels 26, 27 ensure that the indication of the fill level is adapted slowly to any given conditions. The indicating means slowly adapts as a result of a slow escape of air. Thus, the indicating means does not follow any vibrating movements or changes in position of the device 1 in a rapid sequence.

The arrangement of the channels 25 and connecting channels 26, 27 and ribs 12 ensure that even in an inclined position, the liquid cannot escape. This objective is assisted by the connecting channels 26, 27 which are alternately associated with opposed sides of the housing 8 such that they are arranged in an intersecting plane which extends transversely to the direction of movement B.

Furthermore, the cover 14 serves to fix the fill level indicator 7 in cooperation with the edge 16 of the tank 6 and the holding strip 21 of the housing 8 to the tank 6. For this purpose, the cover 14 includes one or a plurality of lugs 28 which are supported on the outer face of the horizontally extending edge portion 17. The lugs 28 are tensionable relative thereto by bolt 32 which passes through the throughbore 30 in the cover 14. The bolt is threaded into the threaded bore 33 of the housing 8 in the region of the thickening of the wall. Furthermore, to improve the supporting condition, the housing 8 includes a projection 31 which is supported on the side face 15 of the tank 6.

While the above detailed description describes the preferred embodiment of the present invention, the invention is susceptible to modification, variation and alteration without deviating from the scope and fair meaning of the subjoined claims.

I claim:

1. A combination fill level indicator and tank for an internal combustion engine, said internal combustion engine adapted to be coupled with a device, comprising:

a housing with an inner chamber connected to the tank, means for making the fill level visible associated with said housing;

said tank including an edge laterally projecting from a side face of said tank, said edge forming an open groove opening downwardly towards a resting face on which the device rests when in use, said housing including an upwardly directed holding strip laterally projecting from an outer face of said housing, said strip matingly engaging the groove of the edge, an upwardly directed opening arranged in an upper end of the housing is closed by a cover which is fixed to the housing, said cover including at least one lug tensionable against the edge of the tank, said cover extending over the upper end of the housing and a labyrinth seal positioned between the cover and the housing, said labyrinth seal forming a ventilation channel leading to free ambient environment.

2. The combination according to claim 1, wherein said cover includes a projection providing support against the side face of the tank.

3. The combination according to claim 1, wherein the cover is securable to the housing by a bolt threaded into the housing.

4. The combination according to claim 1, wherein for the purposes of forming the labyrinth seal, the housing, in the outer face in a region of its upper end, includes spaced ribs defining parallel extending channels arranged around the housing, said parallel extending channels being connected to one another by connecting channels in diametrically opposed regions such that for adjacent two parallel extending channels, arranged one above the other, the connecting channels are alternately associated with the diametrically opposed regions, and said cover, by its inner face, sealingly covers the housing portion provided with the ribs as far as an outlet towards the lower edge of the cover.

5. The combination according to claim 4, wherein said housing is associated with the side face of the tank such that the connecting channels are arranged in an intersecting plane extending transversely to a forward direction of movement of the device on the resting face.

6. The combination according to claim 4, wherein the ribs extend at an angle.

\* \* \* \* \*

UNITED STATES PATENT AND TRADEMARK OFFICE
CERTIFICATE OF CORRECTION

PATENT NO. : 5,657,665
DATED : August 19, 1997
INVENTOR(S) : Heinrich Ostermeier It is certified that error appears in the above-indentified patent and that said Letters Patent is hereby corrected as shown below:

Column 4, line 10, Claim 1,
   "combination" should be --combustion-- (first occurrence)

Column 4, line 10, Claim 1,
   "combination" should be --combustion-- (second occurrence)

Signed and Sealed this

Third Day of February, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,957,665
DATED : September 28, 1999
INVENTOR(S) : Kanzler et al.

It is certified that error appears in the above-identified patent and that said Letters Patent is hereby corrected as shown below:

Title page,
Item [75], Inventors: "Richard Greenley" should read -- Richard Greenly --.

Signed and Sealed this

Sixth Day of November, 2001

Attest:

NICHOLAS P. GODICI
Attesting Officer
Acting Director of the United States Patent and Trademark Office